(No Model.) 2 Sheets—Sheet 1.

P. WRIGHT.
HAY BALING MACHINE.

No. 255,750. Patented Mar. 28, 1882.

Witnesses:
J. W. Garner
W. S. D. Haines

Parvin Wright
Inventor:
By, H. J. Evans
Atty.

(No Model.) 2 Sheets—Sheet 2.
P. WRIGHT.
HAY BALING MACHINE.
No. 255,750. Patented Mar. 28, 1882.
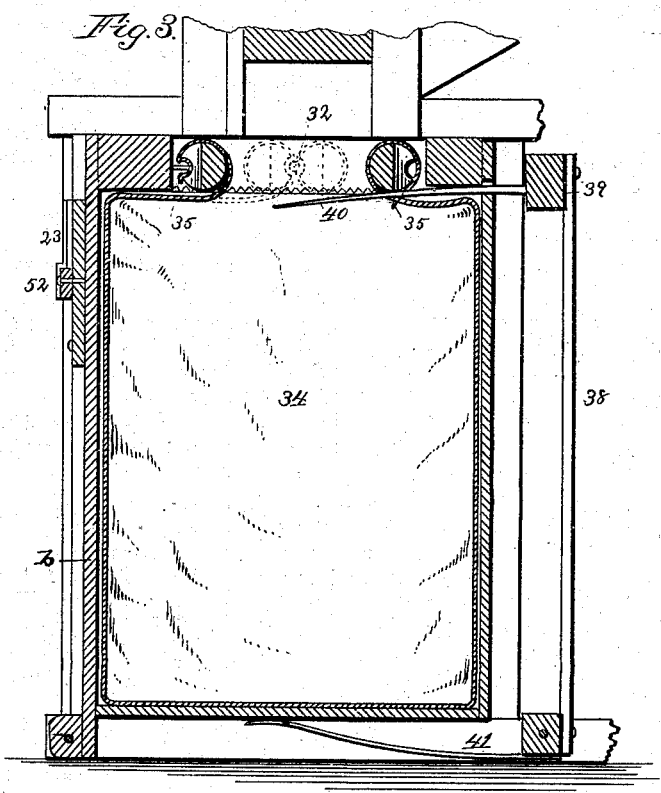
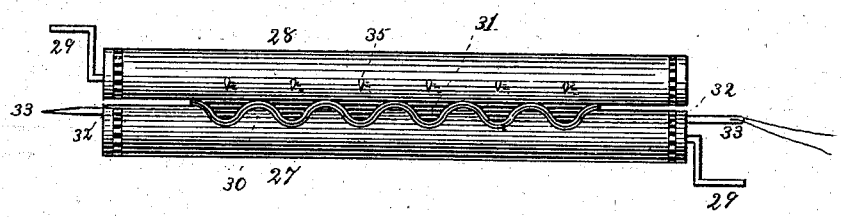
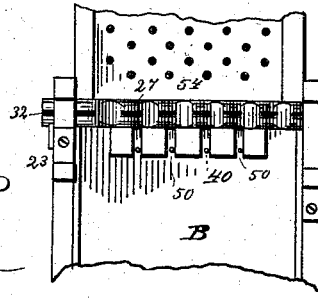
Witnesses:
J. B. Garner
W. S. D. Haines
Inventor:
Parvin Wright
By H. J. Ennis
Atty.

UNITED STATES PATENT OFFICE.

PARVIN WRIGHT, OF GRANITE, COLORADO.

HAY-BALING MACHINE.

SPECIFICATION forming part of Letters Patent No. 255,750, dated March 28, 1882.

Application filed March 4, 1882. (No model.)

*To all whom it may concern:*

Be it known that I, PARVIN WRIGHT, a citizen of the United States, residing at Granite, in the county of Chaffee and State of Colorado, have invented certain new and useful Improvements in Machines for Baling Hay, of which the following is a specification, reference being had therein to the accompanying drawings.

This invention has relation to a novel process and means for baling cut hay or similar substances; and the novelty consists in the process of baling and the combination and construction of parts, as will be hereinafter more fully described, and particularly pointed out in the claims.

In the accompanying drawings similar letters of reference indicate like parts of the invention.

The object of the invention is to bale the cut hay in bales, sacks, or envelopes, so as to protect it while stored or in transit and present it in compact marketable shape.

Figure 1:
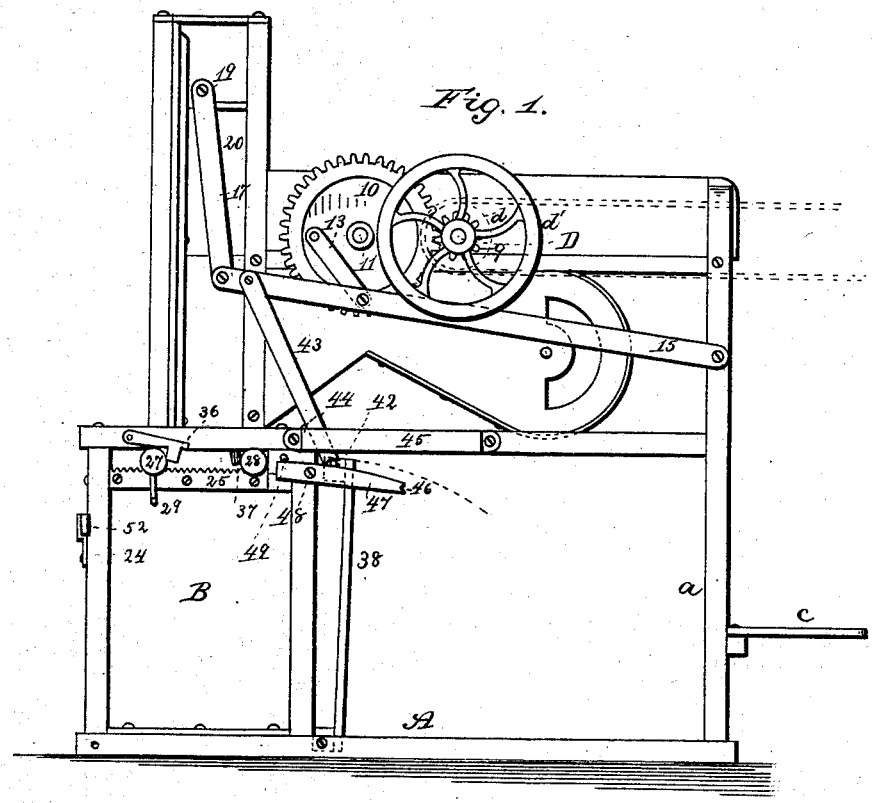
Figure 2:
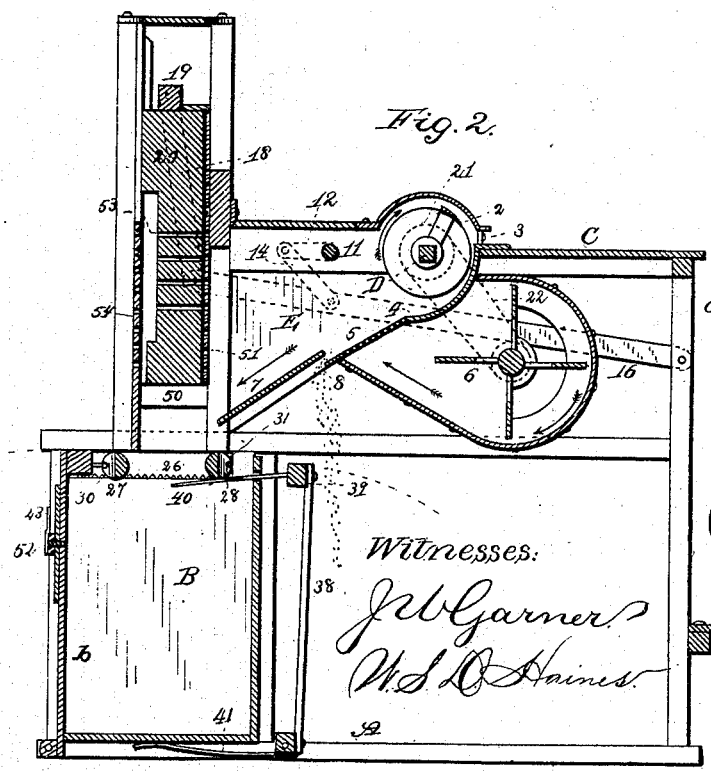

Figure 1 is a side elevation of my improved baling-machine; Fig. 2, a longitudinal sectional elevation; Fig. 3, a detail view of the baling-chamber; Fig. 4, a detached view, showing the manner of sewing up or fastening the bag after it has been filled; and Fig. 5 is a detail of the traverser and bag-holding mechanism.

A is the bottom of the frame-work, to one end of which is secured the baling-chamber B, and at the other end are the uprights *a a*.

C is a platform, upon which the hay is placed just as it comes from the stack. *c* is a step-platform, upon which the operator or feeder stands while feeding the hay into the machine.

D is a shaft, provided with a pulley, *d*, and fly-wheel *d'*, said pulley being connected by belting (shown in dotted lines in Fig. 1) to any suitable motive power; or, in localities where that class of power is wanting, a crank is substituted for the pulley and the operation effected by hand. This shaft D carries a cutter-knife, 2, and as the loose hay is fed from the platform C into the opening 3 this knife 2 cuts it into short bits, and it drops upon the curved partition 4, and thence over the perforated partition 5, where it meets with the air-blast from the fan 6, and is then blown over into the space represented by the letter E in Fig. 2. It then falls by gravity, a part of it directly into the bale-chamber and a part on the inclined bottom 7, said latter part immediately dropping into the bale-chamber. The short bits of hay as they fall from the knife, being of a very light weight, are readily blown into the space E, while the foreign matter—dirt and the like—being of a heavier nature, is not affected by the air-blast, and continues its course over the perforated partition 5 and falls through the opening 8, and is thus simply and effectually separated from the hay.

Secured upon the shaft D is a pinion, 9, which meshes into a gear-wheel, 10, mounted upon a shaft, 11, revolving parallel with the shaft D.

To the gear-wheel 10 on one end of the shaft 11, and to a crank, 12, on the other end, (which corresponds in its throw to the gear,) are secured two connecting-rods, 13 and 14, and they in turn are secured at equal distances to rocking levers 15 and 16, extending along each side of the frame *a a*. The free ends of these levers are connected by the pitmen 17 and 18 to a cross-bar, 19, secured to the upper part of the traverser or follower 20. From these connections it will be seen that the rotary motion given the shaft D imparts a reciprocating or up-and-down motion to the traverser 20. A pulley, 21, is secured to the shaft D, and by the belt 22 communicates motion to the fan 6, and thus when the shaft D is set in motion the knife 2, fan 6, and traverser 20 are simultaneously operated and perform their several functions.

The front part, *b*, of the bale-chamber B constitutes the door, and is hinged at its bottom to the frame A, so as to fall upon the ground when opened, and when shut is secured by a pivoted cross-bar, 52, which operates in reversed staples 23 and 24, attached to the frame-work of the bale-chamber B.

25 and 26 are serrated racks secured to opposite sides of the top of the bale-chamber. These racks serve to give a uniform rotary parallel motion to two peculiarly-constructed rollers, 27 and 28. Both of these rollers at their outer ends are provided with teeth or corrugations, which mesh into the racks 25 and 26, and are further provided with hand-cranks 29, by which they are rolled to and fro on the racks.

The roller 27 has a series of corrugated depressions, 30, extending along the line of its periphery parallel with its axis, and a corresponding series of corrugated projections, 31, are upon the roller 28, so that when these rollers are in contact they present the appearance shown in Fig. 4. In this position a continuous groove or guideway, 32, is formed by a series of gutters, 33, upon the corrugation on the rollers 27 and 28. This guideway or groove 32 allows the needle 33 to be inserted between them and carry the tying-thread along with it.

The bag or envelope 34 is made of a size to correspond with the interior of the bale-chamber, and is all sewed up, except its top, which is left open. The empty bag is then inserted in the bale-chamber, and the open flaps are attached to the rollers 27 and 28 by pressing the ends of the flaps against the pins 35 on the said rollers, which are then rolled back into the position shown in Fig. 3. This leaves the top of the bag open for the reception of the hay, and also allows the traverser to descend between the said rollers, through the mouth of the bag, and into the bale-chamber. After the bag has been filled and the hay compressed the rollers 27 and 28 are then brought into the position shown by the dotted lines in Fig. 3. This compresses the flaps between said rollers in the wave-like position shown in Fig. 4, and while thus held the needle 33 is passed backward and forward and the bag securely tied. The pawls 36 and 37 are to hold the rollers 27 and 28 in their proper separated position while the traverser is operating.

A rectangular frame, 38, is hinged to the frame A, so as to vibrate backward and forward against the outside of the bale-chamber, and its upper part, 39, is provided with a series of teeth, 40, slightly curved, to correspond to the periphery of a circle described by the upper part, 39. A flat spring, 41, is secured to this frame 38, and its free end extends under and presses against the bottom of the bale-chamber. The object of this spring 41 is to hold the frame 38 against the side of the bale-chamber, so that when said frame is forced out of its normal position and then released the spring will cause it to return to its said original position.

A projecting stud, 42, on the upper part, 39, of the frame 38 is so situated as to be operated by the foot of the swinging leg 43, depending from and operated by the rocking lever 15. When the frame 38 is in its normal position the leg 43 is in contact with the stud 42, as seen in Fig. 1. As the traverser 20 descends the leg 43 forces the frame 38 outwardly, as shown by the dotted line. This causes the needles or teeth 40 to be withdrawn from the bale-chamber, and when the traverser is at its lowest point the leg 43 is in a nearly horizontal position, and the under side of it comes in contact with the bend 44 of the guide-strap 45, which position forces said leg 43 out of contact with the stud 42. This frees the frame 38, and the spring 41 causes it to return to its normal position. This frame 38 may be thrown out of operation by forcing it out and placing the stud 42 in the crotch 46 of the arm 47, which is pivoted to the bale-chamber at 48, its inner end resting against a stud, 49. When the stud 42 is in the crotch 46 the leg 43 rides backward and forward over the curved surface of the arm 47, and consequently the frame 38 is not operated. The function of this device is as follows: In the first part of the operation of baling the frame 38 is held out of position by the arm 47 until the bale-chamber is nearly filled with hay. Then the frame 38 is released, and is automatically operated by the leg 43. As the traverser descends the frame 38 withdraws the teeth 40 from the bale-chamber and allows the traverser to force the hay down and compress it. When the traverser is at its lowest point the frame 38 is tripped and the teeth 40 are projected into the bale-chamber into a series of slots, 49, in the lower face of the traverser; and as the traverser is raised these teeth prevent the compressed hay from expanding upward, and as each successive charge of hay is forced down they hold it there until the bag is filled.

A screen, 51, is attached to the back of the traverser, and the holes 53 allow the air-blast to pass outward. A similar screen, 54, is placed in front of the traverser, so that when the traverser is raised the air may still find an exit. The object of these screens 51 and 54 is to retain the cut hay as it is blown over, and at the same time allow the finer dust and dirt (which is carried over with the cut hay in what might be called "mechanical suspension") to be separated and blown outside through them.

The general operation of the device is as follows: The long hay is fed into the opening and cut by the knife, and it passes on into the bale-chamber. In its passage thereto it is thoroughly purified of all refuse or foreign matter by the air-blast. It is then compressed in the bag in the bale-chamber, the bag sewed up and removed. An empty bag is then properly placed in the bale-chamber and the operation continued.

In this manner and by this process the long hay is cut, cleaned, and enveloped in sacks in a simple and expeditious manner.

It is distinctly understood that I reserve the right to vary the details of construction of parts without departing from the spirit and scope of my invention.

What I claim is—

1. The process of baling cut hay, which consists in cutting the hay, then removing foreign matter, and finally compressing the clean cut hay into bales or sacks, substantially as set forth.

2. The process of putting up cut hay into sacks, which consists in cutting the hay, then compressing it into the sack, then closing the mouth of the sack, and finally uniting the seam while in the machine, substantially as set forth.

3. The combination, with a baling-machine, of a cutting-machine, whereby the hay may be cut and baled simultaneously, as and for the purpose set forth.

4. The combination, with a baling-machine and a cutting device, of a fan or blower, whereby the hay is cut, the foreign matter removed by the fan, and the cut hay compressed into bales, substantially as and for the purpose set forth.

5. The combination, with a baling-chamber, a cutting device, and a compressing means, of devices for closing the mouth of a sack or its equivalent, substantially as described.

6. In a baling-press, the combination of a cutting device, pressing means, and means for holding a sack or its equivalent under the pressing device, substantially as described.

7. In a baling-press, the combination of two movable rollers and positive means for bringing them together so as to close the mouth of the sack or its equivalent, attached to the rollers, substantially as described.

8. In a baling apparatus, the two rollers 27 and 28, arranged at the receiving end of a baling-chamber, said rollers being corrugated and grooved, substantially as described.

9. In a baling apparatus, the combination, with a blower or its equivalent, of a reciprocating traverser, which is perforated for the passage of foreign matter separated from the cut hay, substantially as described.

10. In a baling-press, the combination, with a baling-chamber and a reciprocating traverser, of actuated means for retaining the partially-compressed bale while an additional charge is being inserted, substantially as described.

11. In a baling-press, the combination, with a bale-chamber and a reciprocating traverser, of automatically-actuated means for retaining the partially-compressed bale while an additional charge is being inserted, and trip mechanism, substantially as described.

12. In a baling-press, the combination, with the traverser 20, of the frame 38 and teeth 40, automatically operated by the traverser in its forward motion, as and for the purpose set forth.

13. The bale-chamber B, provided with the serrated racks 25 and 26, in combination with the rollers 27 and 28, substantially as and for the purpose set forth.

14. The bale-chamber B, in combination with the traverser 20, having transverse orifice 53, screen 51, and the stationary screen 54, substantially as and for the purpose set forth.

15. The combination of the hay-cutting device with the fan or its equivalent, whereby the hay may be cut and the foreign matter extracted prior to the baling operation, substantially as and for the purpose set forth.

In testimony whereof I affix my signature in presence of two witnesses.

PARVIN WRIGHT.

Witnesses:
J. W. WARD,
J. F. ERDLEN.